(12) United States Patent
Becker

(10) Patent No.: US 8,589,060 B2
(45) Date of Patent: *Nov. 19, 2013

(54) METHOD FOR AUTOMATICALLY CONTROLLING A VEHICLE

(75) Inventor: Jan-Carsten Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 983 days.

This patent is subject to a terminal disclaimer.

(21) Appl. No.: 12/444,365

(22) PCT Filed: Aug. 20, 2007

(86) PCT No.: PCT/EP2007/058619
§ 371 (c)(1),
(2), (4) Date: Jan. 8, 2010

(87) PCT Pub. No.: WO2008/040595
PCT Pub. Date: Apr. 10, 2008

(65) Prior Publication Data
US 2010/0114490 A1    May 6, 2010

(30) Foreign Application Priority Data
Oct. 5, 2006    (DE) .......................... 10 2006 047 131

(51) Int. Cl.
*G06F 17/10* (2006.01)
(52) U.S. Cl.
USPC ............ 701/301; 701/117; 340/435; 340/436

(58) Field of Classification Search
USPC ........... 701/117, 301; 340/435, 436, 438, 903
See application file for complete search history.

(56) References Cited

U.S. PATENT DOCUMENTS

| | | | |
|---|---|---|---|
| 5,548,516 A | 8/1996 | Gudat et al. | |
| 8,321,066 B2 * | 11/2012 | Becker et al. | 701/1 |
| 2004/0158355 A1 * | 8/2004 | Holmqvist et al. | 700/245 |
| 2004/0193374 A1 * | 9/2004 | Hac et al. | 701/301 |
| 2007/0027612 A1 * | 2/2007 | Barfoot et al. | 701/117 |

FOREIGN PATENT DOCUMENTS

| | | |
|---|---|---|
| CN | 2775716 | 4/2006 |
| DE | 101 28 792 | 11/2002 |
| DE | 102 31 556 | 1/2003 |
| DE | 10 2004 047130 | 9/2004 |
| DE | 10 2004 007 553 | 9/2005 |
| DE | 10 2004 045 606 | 3/2006 |
| EP | 970 875 | 1/2000 |
| EP | 1 251 060 | 10/2002 |
| EP | 1 387 183 | 2/2004 |
| EP | 1 470 958 | 10/2004 |
| JP | 2000 302057 | 10/2000 |
| WO | 03/006291 | 1/2003 |
| WO | 2005/080133 | 9/2005 |
| WO | 2006/042512 | 4/2006 |

* cited by examiner

*Primary Examiner* — Gertrude Arthur Jeanglaude
(74) *Attorney, Agent, or Firm* — Kenyon & Kenyon LLP

(57) ABSTRACT

A method for automatically controlling a vehicle, in which information about at least one area that is freely passable by the vehicle is taken into account in order to provide an evasion trajectory of the vehicle with respect to an obstacle.

24 Claims, 3 Drawing Sheets

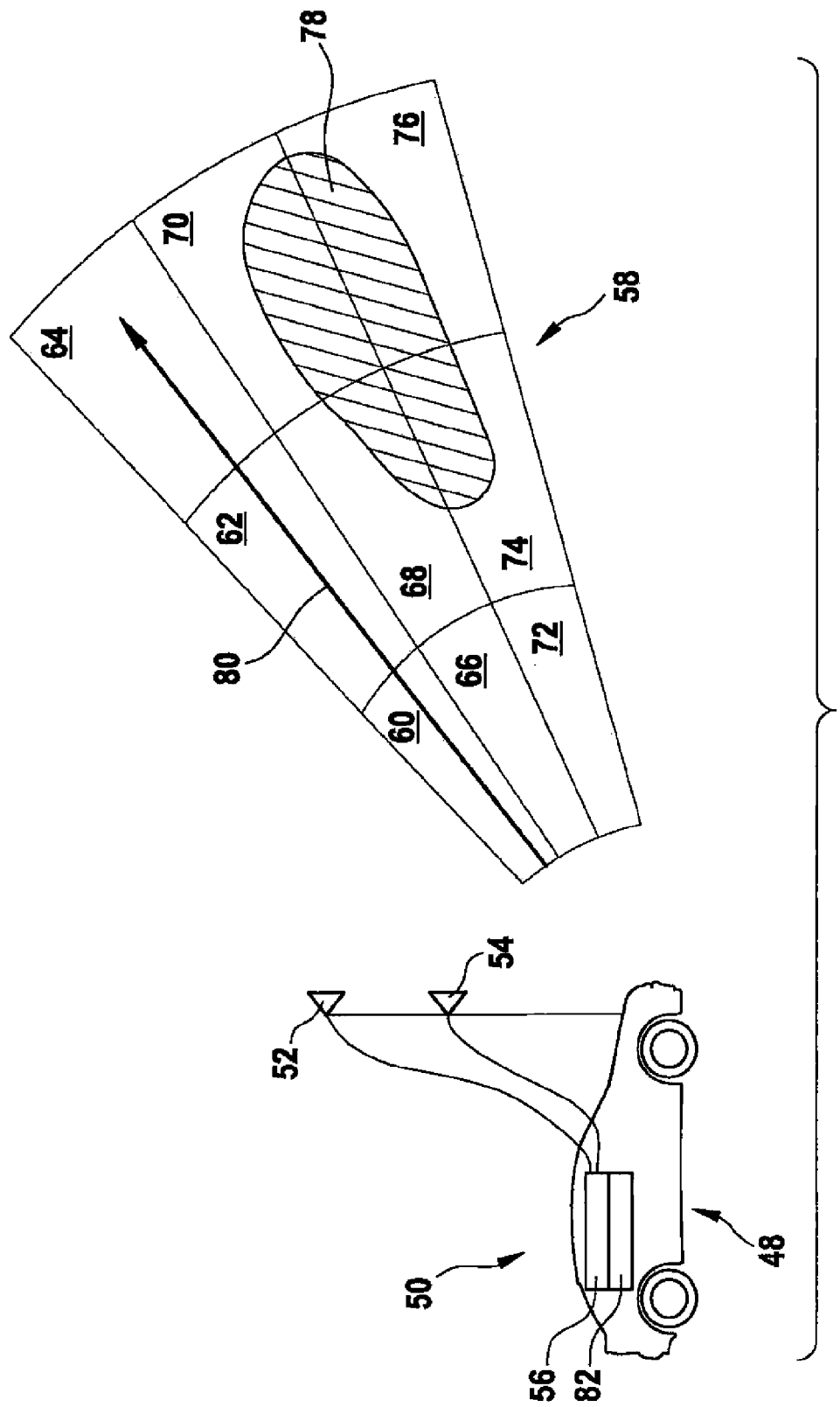

METHOD FOR AUTOMATICALLY CONTROLLING A VEHICLE

FIELD OF THE INVENTION

The present invention relates to a method and a device for automatically controlling a vehicle, and a computer program and a computer program product.

BACKGROUND INFORMATION

A goal in the development of new vehicles is the constant improvement of safety. While in the past this was achieved essentially via passive measures, such as seat belts, crumple zones, or air bags, for example, the most recent improvements are in the field of active safety. For example, the ABS prevents the wheels from locking in the event of full braking and thus guarantees steerability at all times. The ESP stabilizes the vehicle even at the limit of driving dynamics. With the aid of ASR, it is possible to prevent wheel spinning. In order to achieve an additional increase in safety, it is increasingly being attempted to detect specific dangerous driving situations early using a sensor system that detects the surroundings, and to react in a correspondingly preventative manner.

Methods for sensor signal processing for systems for detecting surroundings of robots have been known for some time from computer science and robotics. In this connection, the detection range of the sensors is divided into a predefined number of fields. For each field, a probability value is determined as a measure for the existence of the obstacle in the respective field. Such methods are known as occupancy grids or belief grids or evidence grids.

Recently, these methods or variants of these methods have also been used in the field of driver assistance systems for motor vehicles at original equipment manufacturers (OEMs) or their research partners and research establishments.

A detection device and a safety system for a motor vehicle are described in printed publication DE 10 2004 007 553 A1. It provides for the existence of obstacles in the area surrounding the motor vehicle to be inferred, in that the probability value of each field is compared to a predefined probability threshold value. If the probability value of the field is greater than the predefined probability threshold value, then the existence of an obstacle in this field is inferred.

A method for triggering and performing a deceleration of a vehicle is described in printed publication WO 03/006291 A1. It is provided that in the event of a dangerous situation, a braking or steering intervention or a combination of both is automatically performed in order to avoid a collision or to reduce possible consequences of a collision. This takes place in view of objects detected by a sensor.

Printed publication EP 1 387 183 A1 additionally discusses a method for detecting the imminence of an unavoidable collision. With the aid of attainable possible positions of involved objects, areas may be described and considered with regard to each other, so that a disappearance of an area of positions of an object allows for the unavoidability of the imminent collision to be inferred.

A method for influencing the travel trajectories of automobiles is discussed in printed publication DE 10 2004 045 606 A1. In this connection, essentially the automobile is to be guided on a specific, previously calculated trajectory, so that specific maneuvers are able to be performed in a reproducible manner. In particular, the performance of crash tests is named as an application field in this context; however, it is also to be used for the coordinated travel of two road users, so that instead of a specifically precipitated collision, the latter is precisely avoided. In this context, the required information comes from an external coordinator or from the other involved vehicle through a line-conducted or a non-line-conducted transmission arrangement. The information required in this instance is not provided by one's own corresponding surroundings sensor system and a corresponding understanding of the situation, but rather is provided directly by the other road user.

A steering system for motor vehicles is discussed in printed publication EP 970 875 A. Through this steering system, a collision between a vehicle equipped with the steering system and an obstacle is to be avoided by a suitable steering intervention. The steering system includes a regulating and control system, with which the setpoint and actual steering angle are regulated and controlled during operation of the vehicle.

Printed publication JP 2000 302057 A discusses a method for a vehicle, which in the event of an existing obstacle evaluates different solution strategies, which can lead to a braking and/or a steering intervention.

A method and a device for predicting movement trajectories of objects are disclosed in printed publication DE 102 31 556 A1. In this connection, only braking and evasion trajectories that take the vehicle to the limit in terms of driving dynamics are taken into account. Through a surroundings sensor system, movements of involved objects are detected, and their trajectories predicted. With the aid of these predicted object trajectories, it is then possible to calculate a system intervention that de-escalates in the best possible way.

In printed publication EP 1 251 060 A2, a method for vehicle control is discussed, which is to support the driver during evasion, as soon as it is detected that a sole braking reaction is no longer sufficient for avoiding a collision. To this end, in the event that a collision-avoiding evasion maneuver is detected, the steering properties of the vehicle are modified. Essentially, this is achieved by activating a rear-wheel steering and by applying braking torques.

SUMMARY OF THE INVENTION

In the method according to the present invention for automatically controlling a vehicle, information about at least one area that is freely passable by the vehicle is taken into account in order to provide an evasion trajectory of the vehicle with respect to an obstacle.

It may be provided that for the purpose of evading the obstacle, the vehicle is controlled such that the evasion trajectory for an evasion maneuver of the vehicle proceeds through the area that is detected to be freely passable. Accordingly, the vehicle is controlled and in particular steered along a path that is free of obstacles, the vehicle being controlled by appropriate steering maneuvers, and braking or accelerating maneuvers, in such a manner that a collision with the obstacle is avoided.

In one specific embodiment of the method, a trajectory that is driven by the vehicle is predicted or forecasted in a cyclical manner. On this basis, the method is implemented only when, in a current and thus cyclically predicted trajectory, the vehicle is headed toward a detected obstacle, and it is possible to drive in the area that is detected to be freely passable. As an additional condition for executing the method, a check may be carried out to see whether a person controlling the vehicle is able to avoid the obstacle independently through appropriate control commands; this option is able to be implemented, for example, taking into account a reaction time, in particular the so-called driver perception-reaction time, of the person. It is additionally conceivable to take into account in this context in particular the quantitative extent to which such control commands, for example, steering commands, are to be carried out by the person.

In one embodiment of the method, data for detecting obstacles in surroundings of the vehicle and data for detecting freely passable areas in the surroundings are processed together and merged as needed, so that the freely passable area that is suitable for evasion may be determined. Apart from this, a cell-grid-based analysis of the surroundings is performed. This means that the surroundings of the vehicle are divided into a grid of cells, so that for each cell a conclusion may be drawn regarding whether this cell is now occupied by an object or obstacle or is free. A freely passable area may then be compiled out of multiple contiguous free cells.

Furthermore, it may be provided that the data for detecting obstacles are provided by at least one first sensor of the vehicle, as a rule, a radar, video, or lidar sensor, and the data for detecting freely passable areas are provided by at least one second sensor of the vehicle, as a rule, a video or lidar sensor.

The exemplary embodiments and/or exemplary methods of the present invention also relates to a device for automatically controlling a vehicle. This device is designed to take into account information about at least one area that is able to be freely passed by the vehicle in order to provide an evasion trajectory of the vehicle with respect to an obstacle.

At least individual, or all steps of the method according to the present invention are able to be performed using this device, in particular, using modules of this device, such as sensors or a processing module for processing sensor data and for providing the evasion trajectory, for example. The device may also have an activation or an application module, or work together with such an application module, this application module being provided to control the vehicle automatically, that is, to steer or brake or accelerate, taking into account the evasion trajectory, such that the vehicle is able to perform the evasion maneuver to provide the evasion trajectory.

The computer program according to the present invention, having a program code arrangement, is suited to perform all steps of a method according to the present invention when the computer program is executed on a computer or a corresponding processing unit, especially in a device according to the present invention.

The exemplary embodiments and/or exemplary methods of the present invention also relates to a computer program product having a program code arrangement, which are stored on a computer-readable storage medium, for executing all steps of a method according to the present invention when the computer program is executed on a computer or a corresponding processing unit, in particular in a device according to the present invention.

The exemplary embodiments and/or exemplary methods of the present invention implements a safety and/or assistance system for motor vehicles for avoiding accidents by evading obstacles, taking into account obstacle and passability information. In addition to detecting objects, that is, zones that are occupied and thus unavailable for vehicle driving, the sensors that are used in the device to detect the vehicle's surroundings may also directly detect free, that is, passable, areas within free zones.

In contrast to the previously known methods for avoiding accidents by evasion, the advantage of this method is that an evading intervention in the vehicle guidance takes place only if the evasion trajectory is able to be driven on an area that is detected to be passable. The risk of a faulty intervention is thus significantly reduced. An evasion maneuver takes place only when the predicted, respectively current trajectory of the vehicle is on a collision course, that is, when a zone detected by the surroundings sensor to be occupied is nearly reached, and there is no alternative trajectory left that avoids the collision with the obstacle and that the driver may still drive using normal, comfortable control commands or steering interventions. Additionally, it is provided that an alternative evasion trajectory is able to be driven, so that the collision is able to be avoided in that the trajectory proceeds through a free area, that is, through a zone that the surroundings sensor detects to be passable.

In a development of the exemplary embodiments and/or exemplary methods of the present invention, cell-grid-based methods for processing raw sensor data may be used. Additionally, a multisensor data merge for active vehicle safety systems may be used. The exemplary embodiments and/or exemplary methods of the present invention may also include a processing of radar spectra for radar detections, for which purpose an intra-radar sensor-signal processing for processing radar spectra for radar detections is performed. Within the framework of the exemplary embodiments and/or exemplary methods of the present invention, it is possible to provide that different object hypotheses for comfort and safety functions in driver-assistance systems are generated, which are based on a cell-grid-based modeling of the surroundings. For this purpose, a plurality of different function-specific threshold values are defined as a function of the different requirements for the object hypothesis of different driver-assistance systems.

In a further development of the exemplary embodiments and/or exemplary methods of the present invention, a joint processing and merging of data from object and/or feature detection and free-area detection is used with the cell-grid-based modeling of the surroundings for driver-assistance systems and in particular for predictive safety systems. For this purpose, the surroundings of the vehicle may be split up into individual cells. One result of this is a surroundings description for driver-assistance systems and in particular for predictive safety systems that models the probability that zones are passable, the probability that zones are not passable, and a remaining uncertainty. The integrated processing and description of passable and non-passable areas provides, in particular for the evasion of obstacles, an increase in the benefit of assistance systems and, in particular, for safety systems.

A long-range radar sensor (LRR) is suitable to be used as the at least one first sensor, in particular, radar sensor, for sensing surroundings for the device, and thus for a driver-assistance and safety system. This sensor measures the power of a transmitted wave that is scattered back by a reflector. Thus, the sensor detects, in particular, metallic objects, such as vehicles, that reflect well, but also, for example, manhole covers or food product packaging having a metallic coating, which as a rule are not relevant for vehicle guidance. However, this sensor cannot detect the spatial dimensions of objects, likewise, it cannot detect free areas.

The device may have a video sensor as at least one first and/or second sensor, which video sensor detects the vehicle surroundings using a video camera and evaluates the recorded images using a corresponding signal processing. In this context, the kinematic variables distance and speed, which are particularly interesting for vehicle guidance, are indirectly measured. Video sensors are well suited for the measurement of geometric objects such as road markings, which as a rule follow known models. A direct three-dimensional measurement using explicit a priori knowledge, for example, by using pattern recognition, is possible, in particular for the monoscopic methods, which are particularly beneficial for use in motor vehicles for cost and handling reasons. Unknown objects are indirectly measured in this manner. Video sensors have a particularly great potential precisely because of the possibility of detecting optical patterns. In this manner, it may also be detected with a certain reliability, for example, by the specific texture, that the road surface is a free area. Furthermore, in the event that an object or obstacle is detected by the direct optical measuring method, it is possible to infer with a certain reliability that the path up to this object is not occupied and thus is free.

A lidar sensor may likewise be provided as the at least one first and/or second sensor of the device. The lidar sensor directly determines the distance to a reflecting object by measuring the echo time of the transmitted wave. Due to the wavelength in the infrared range, the detection range depends on the environmental conditions to a certain extent. Additionally, the detection range is a function of the reflection properties of the target to be detected. Lidar sensors having fixed beams may be implemented in a relatively cost-effective manner; scanning lidar sensors (laser scanners) allow for a high resolution and a high angular coverage, at least horizontally. As is the case with video sensors, when an object is detected by the direct optical measuring method, it is possible to infer with a certain reliability that the path up to this object is not occupied and thus is free.

In the field of driver-assistance systems, adaptive cruise control (ACC) implements a comfort function. Safety functions may also be performed by the predictive safety system (PSS) system family. While only relatively minor interventions in the vehicle guidance occur in comfort systems, the interventions may go up to a fully automatic emergency braking using maximum deceleration in safety systems. Using the exemplary embodiments and/or exemplary methods of the present invention, different requirements of the object hypotheses of surroundings sensing systems may be fulfilled in comfort functions and safety functions. In particular, the very high requirements of the false triggering rates in safety systems and thus also of the signal processing of the surroundings sensing systems for such safety systems are able to be handled by the exemplary embodiments and/or exemplary methods of the present invention.

As a rule, current driver-assistance and safety systems are based on a radar sensor. The radar sensor can detect only objects, but not free areas. The at least one second sensor provided to implement the exemplary embodiments and/or exemplary methods of the present invention may also explicitly detect free areas. In contrast to the exemplary embodiments and/or exemplary methods of the present invention, in none of the documents known from the related art is information regarding free areas taken into account in the event of an intervention in the vehicle guidance.

The exemplary embodiments and/or exemplary methods of the present invention explicitly takes into account information about freely passable zones. The evasive intervention in the vehicle guidance takes place only if the evasion trajectory is provided for the evasion maneuver. Furthermore, significantly larger application fields may be realized than is the case when using exclusively braking systems.

Compared to the methods for avoiding accidents by evasion known from the related art, the advantage of this invention is that the risk of a faulty intervention is significantly reduced by the fact that an evasive intervention in the vehicle guidance, typically in the steering, takes place only when the evasion trajectory is able to be driven in an area that is detected to be passable.

The evasion maneuver takes place in the development only when the predicted trajectory of the vehicle is on a collision course, that is, when a zone detected by the surroundings sensor to be occupied is nearly reached, and there is no more trajectory that avoids the collision with the obstacle and that the driver may still drive using normal, comfortable steering interventions. Accordingly, an alternatively drivable trajectory is known, through which the collision may be avoided in that it proceeds through a free area, i.e., proceeds through a zone that the surroundings sensor detects to be passable.

In the device according to the present invention, at least one first sensor for sensing surroundings is able to detect within its given detection range occupied, i.e., non-passable, zones or regions, and ideally is also able to specify on this basis the probability that these zones are occupied. This may be an object-detecting sensor (e.g., radar, video, or lidar), for example. This may also be an already existing sensor (e.g., LRR2), which abstracts the description of the surroundings using so-called object lists or using position-finding lists. Furthermore, at least one second sensor for sensing surroundings is able to detect free areas, that is, not occupied, i.e., passable, zones within its given detection range, and on this basis is also able to specify the probability that these areas are free. This does not necessarily have to be a separate sensor system. For this purpose, it is conceivable to use a video or laser sensor, for example. The surroundings sensing may also be provided by a sensor that is implemented by an algorithm for detecting free areas that runs in the video sensor. The dependencies that develop, for example, because the algorithm, which indeed runs separately, uses, among other things, the same hardware for recording images and thus the same image as the algorithms for object detection, are to be taken into account in probability attributes, which are calculated by sensor models of the sensors used, for example. Furthermore, a sensor that derives information regarding free areas from occupancy information in accordance with its measurement principle is also conceivable.

To model surroundings and/or to merge sensor data, the sensors may transmit their data about obstacles and free areas directly to a module provided for the calculation of the evasion trajectory, a processing module, for example, and to a device module provided for triggering or controlling the evasion maneuver, a triggering or activation module, for example.

Alternatively and/or additionally, the sensor data may run through a central module for merging sensor data; this may take place as part of a joint processing and merging of data from object and/or feature detection and free area detection using the cell-grid-based surroundings modeling for driver-assistance systems and in particular for predictive safety systems. One result is the surroundings description for driver-assistance systems and in particular for predictive safety systems that models the probability that zones are passable, the probability that zones are not passable, and the remaining uncertainty. For the assistance system, the relevant region, or the region detected by the surroundings sensor, of the vehicle surroundings may be divided into a predefined number of n cells. For each of these n cells, an attribute is calculated and stored, which specifies the probability $P_i(occupied)=P_i(o)$ that an $i^{th}$ cell is occupied by an object relevant for the vehicle guidance and accordingly is not passable. Furthermore, an attribute is calculated and stored, which specifies the probability $P_i(free)=P_i(f)$ that the $i^{th}$ cell is not occupied by an object relevant for the vehicle guidance and accordingly is passable.

To this end, the trajectory that the vehicle will drive when the driver guides the vehicle is predicted cyclically. For example, to this end, known intra-vehicle data for kinematic variables, such as speed, acceleration, steering angle, yaw rate, yaw acceleration, etc., are used.

If in one specific embodiment of the present invention this predicted trajectory is on a collision course with a detected obstacle, then a calculation is made as to whether there is a trajectory that may be driven by the driver using normal control commands or steering interventions (for example, $a_{lateral,max}$=4 m/s$^2$) which avoids the collision with the obstacle. When there is no more trajectory able to be driven using normal steering interventions, then a calculation is made regarding whether there is a trajectory that is able to be driven using the physically maximum possible steering interventions, which proceeds through the zone detected by the surroundings sensor to be passable. If this is the case, then an evasion maneuver on this trajectory is triggered.

Further advantages and refinements of the exemplary embodiments and/or exemplary methods of the present invention are yielded from the description and the accompanying drawing.

It is understood that the aforementioned features and the features still to be discussed in the following text may be used not only in the respectively indicated combination but also in other combinations or by themselves without leaving the scope of the present invention.

The exemplary embodiments and/or exemplary methods of the present invention is represented schematically in the drawing in light of specific embodiments, and is described in detail below with reference to the drawing.

BRIEF DESCRIPTION OF THE DRAWINGS

FIG. 4 schematically depicts a specific embodiment of a device according to the present invention.

DETAILED DESCRIPTION

Figure 1:
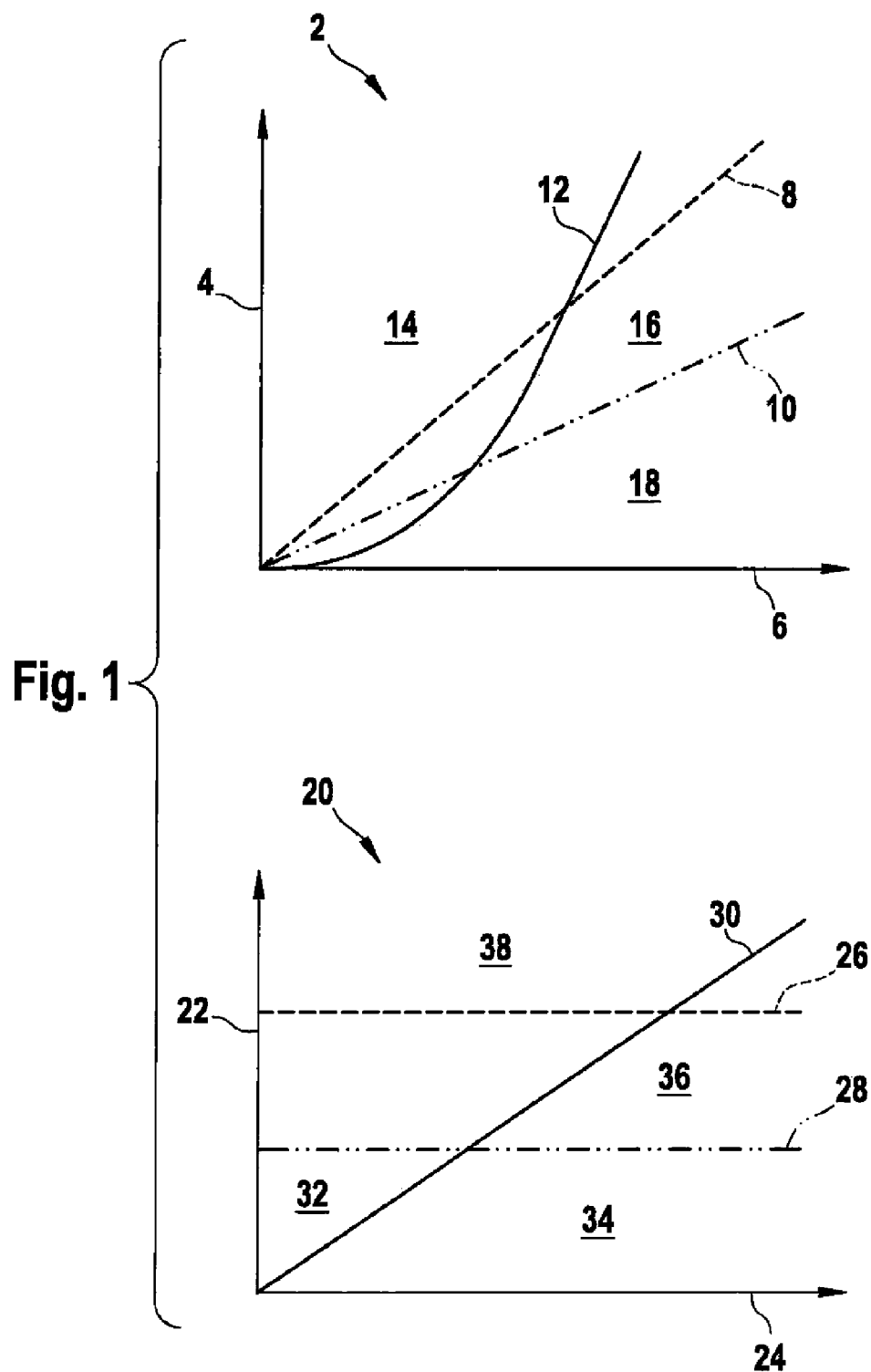
FIG. 1 shows diagrams for examples of interrelations between braking and evasion maneuvers.

The figures are described in a cohesive and comprehensive manner; matching reference numerals denote identical components.

In a first diagram 2 from FIG. 1, a distance between a vehicle and an obstacle is plotted along a vertically oriented axis 4 above a relative speed along a horizontally oriented axis 6 of diagram 2. In this first diagram 2, a first straight line 8, indicated by dashes in this instance, denotes a state according to which a last comfortable evasion possibility is possible. A second straight line 10, indicated by dots and dashes in this instance, denotes a state according to which a last evasion possibility is possible. A last braking possibility is denoted by curve 12. Thus, in a first region 14 of the diagram, which region is delimited by vertically oriented axis 4 for the distance, first straight line 8, and curve 12, braking or evasion is possible. Within a second region 16, which is delimited by curve 12 and first straight line 8 and second straight line 10, a highly dynamic evasion is possible. In a third region 18 of first diagram 2, which is delimited by second straight line 10, curve 12, and horizontally oriented axis 6 for the relative speed, a collision is not avoidable; however, consequences of an accident may be reduced within this third region 18.

In the second diagram 20 from FIG. 1, a time period up to a collision between the vehicle and the obstacle is plotted along a vertically oriented axis 22 above the relative speed along a horizontally oriented axis 24. In this second diagram 20, a first dashed straight line 26 denotes a state for a last comfortable evasion possibility. A second straight line 28, indicated by dots and dashes, which is also parallel to the horizontally oriented axis 24, denotes a state for a last evasion possibility. A last braking possibility is delimited by third straight line 30, which proceeds through the origin. In a first region 32 of this second diagram 20, it is possible to avoid an accident by braking. Within a second region 34, which is delimited by horizontally oriented axis 24, second straight line 28, and third straight line 30, indeed a collision cannot be avoided, but consequences of an accident may be reduced. In a third region 36, which is delimited by three straight lines 26, 28, 30, a highly dynamic evasion is possible. In a fourth region 38, which is delimited by first straight line 26, third straight line 30, and vertically oriented axis 22, braking or evasion is possible.

FIG. 1 thus shows a theoretical comparison of latest possible action times of braking and evasion maneuvers. It becomes clear that using only braking interventions, it is possible to avoid accidents only at low relative speeds. At higher relative speeds, only a reduction of the accident severity is able to be achieved by braking interventions. Furthermore, FIG. 1 shows that precisely at higher relative speeds, it is definitely possible to avoid accidents by highly dynamic evasion.

Figure 2:
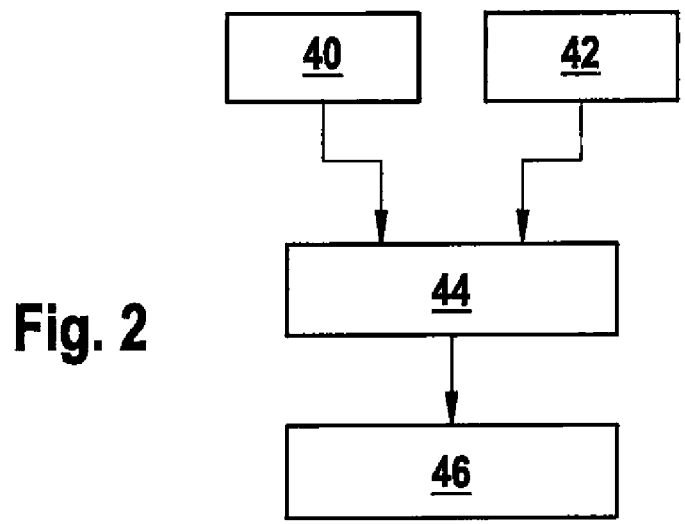
FIG. 2 shows a diagram for a first specific embodiment of the method according to the present invention.

FIG. 2 shows a diagram or a block diagram for a first specific embodiment of the method according to the present invention. In this instance, obstacles are detected by at least one first sensor in an obstacle detection 40. At the same time as this obstacle detection 40, free areas are detected by at least one second sensor in a free area detection 42. Sensor data, which are provided in obstacle detection 40 and in free area detection 42, respectively, are transmitted to a joint processing 44. In this joint processing 44, at least one evasion trajectory is calculated for the vehicle and an evasion maneuver for the vehicle is triggered as a function of an implementation of the evasion trajectory. As a function of a result provided in this processing 44, an activation 46 of an actuating system of the vehicle is carried out, so that the evasion maneuver is performed taking into account a freely passable area.

Figure 3:
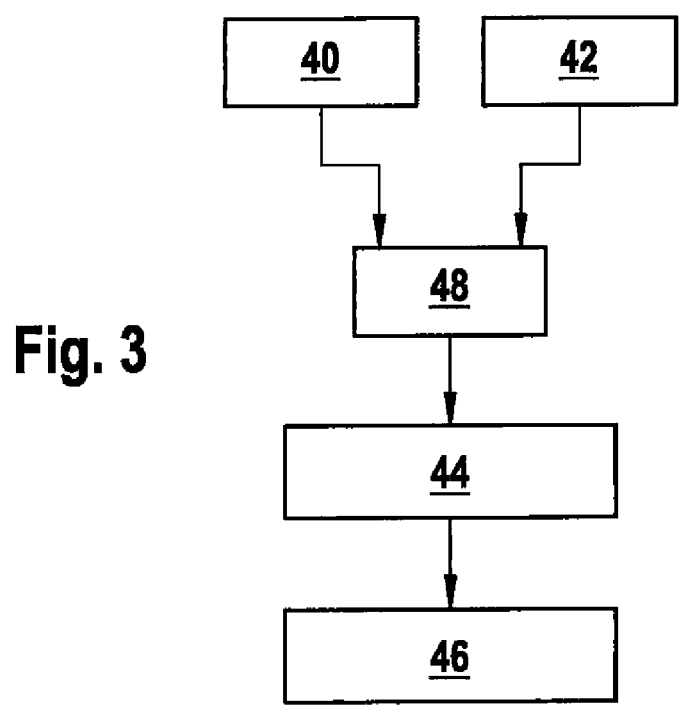
FIG. 3 shows a diagram for a second specific embodiment of the method according to the present invention, including a sensor data merge.

Supplementing the diagram shown in FIG. 2, the diagram for the second specific embodiment of the method according to the present invention from FIG. 3 additionally provides in an intermediate step a sensor data merge 48 of those sensor data that are provided in obstacle detection 40 by the at least one first sensor and in free area detection 42 by the at least one second sensor. After this processing 44, the provided information is supplied to activation 46, as already clarified with the aid of FIG. 2.

FIG. 4 shows schematically a vehicle 48 that has a schematically illustrated specific embodiment of a device 50 according to the present invention. This specific embodiment of device 50 according to the present invention includes a first sensor 52, a second sensor 54, and a processing module 56.

The illustration also shows schematically surroundings 58 of vehicle 48. These surroundings 58 are divided into cells 60, 62, 64, 66, 68, 70, 72, 74, 76. In this instance, it is provided that an obstacle 78 is located in cells 68, 70, 74, 76. Other cells 60, 62, 64, 66 and 72 are free in the present specific embodiment.

For the detection of surroundings 58, it is provided that the obstacle is detected by first sensor 52. Second sensor 54 detects free cells 60, 62, 64, 66, 72, from which a free area is compiled in this instance. Data for the detection of obstacle 78, which are provided by first sensor 52, and data for the detection of free cells 62, 64, 66, 72, which are provided using second sensor 54, are jointly processed by processing module 56 and in this context also merged in the present specific embodiment. On the basis of these provided data, processing module 56 thus provides an evasion trajectory 80 for a freely passable area of free cells 60, 62, 64, 66, 72, which is to be passed by vehicle 48 without resulting in a collision with obstacle 78.

Furthermore, an activation module 82 of device 50 initiates an evasion maneuver for the vehicle by triggering an actuating system of vehicle 48. In this instance, activation module 82 controls vehicle 48 using suitable control commands, for example, steering commands, and braking or accelerating commands, such that as vehicle 48 continues to follow evasion trajectory 80 it evades obstacle 78, so that a collision with obstacle 78 is avoided.

What is claimed is:

1. A method for automatically controlling a vehicle, the method comprising:
   detecting at least one area that is freely passable by the vehicle;
   providing information about the at least one area that is freely passable by the vehicle; and
   taking into account the information about at least one area that is freely passable by the vehicle to provide an evasion trajectory of the vehicle with respect to an obstacle.

2. The method of claim 1, wherein for evading the obstacle, the vehicle is controlled so that the evasion trajectory of the vehicle proceeds through the area detected to be freely passable.

3. The method of claim 1, in which a trajectory that is driven by the vehicle is predicted cyclically.

4. The method of claim 3, wherein the method is implemented only when, in the predicted trajectory, the vehicle heads toward a detected obstacle, and it is possible to drive in the area that is detected to be freely passable.

5. The method of claim 1, wherein a check is performed to determine whether a person controlling the vehicle is able to evade the obstacle by suitable control commands.

6. The method of claim 1, wherein first data for detecting obstacles in surroundings of the vehicle and second data for detecting freely passable areas in the surroundings are processed together, and the freely passable area suitable for evasion is determined based on the first data and the second data.

7. The method of claim 6, wherein the first data for detecting the obstacles are provided by at least one first sensor of the vehicle, and wherein the second data for detecting freely passable areas are provided by at least one second sensor of the vehicle.

8. The method of claim 6, further comprising:
   performing a cell-grid-based analysis of the surroundings.

9. A device for automatically controlling a vehicle, comprising:
   a detecting arrangement to detect at least one area that is freely passable by the vehicle;
   a information arrangement to provide information about the at least one area that is freely passable by the vehicle; and
   a processing arrangement to take into account the information about at least one area that is freely passable by the vehicle to provide an evasion trajectory of the vehicle with respect to an obstacle.

10. The device of claim 9, wherein for evading the obstacle, the vehicle is controlled so that the evasion trajectory of the vehicle proceeds through the area detected to be freely passable.

11. The device of claim 9, in which a trajectory that is driven by the vehicle is predicted cyclically.

12. The device of claim 11, wherein the information is only taken into account when, in the predicted trajectory, the vehicle heads toward a detected obstacle, and it is possible to drive in the area that is detected to be freely passable.

13. The device of claim 9, wherein a check is performed to determine whether a person controlling the vehicle is able to evade the obstacle by suitable control commands.

14. The device of claim 9, wherein first data for detecting obstacles in surroundings of the vehicle and second data for detecting freely passable areas in the surroundings are processed together, and the freely passable area suitable for evasion is determined based on the first data and the second data.

15. The device of claim 14, wherein the first data for detecting the obstacles are provided by at least one first sensor of the vehicle, and wherein the second data for detecting freely passable areas are provided by at least one second sensor of the vehicle.

16. The device of claim 14, wherein a cell-grid-based analysis of the surroundings is performed.

17. A computer-readable data medium having a computer program which is executable by a processor, comprising:
   a program code arrangement having program code for automatically controlling a vehicle by performing the following:
      detecting at least one area that is freely passable by the vehicle;
      providing information about the at least one area that is freely passable by the vehicle; and
      taking into account the information about at least one area that is freely passable by the vehicle to provide an evasion trajectory of the vehicle with respect to an obstacle.

18. The computer-readable data medium of claim 17, wherein for evading the obstacle, the vehicle is controlled so that the evasion trajectory of the vehicle proceeds through the area detected to be freely passable.

19. The computer-readable data medium of claim 17, in which a trajectory that is driven by the vehicle is predicted cyclically.

20. The computer-readable data medium of claim 19, wherein the method is implemented only when, in the predicted trajectory, the vehicle heads toward a detected obstacle, and it is possible to drive in the area that is detected to be freely passable.

21. The computer-readable data medium of claim 17, wherein a check is performed to determine whether a person controlling the vehicle is able to evade the obstacle by suitable control commands.

22. The computer-readable data medium of claim 17, wherein first data for detecting obstacles in surroundings of the vehicle and second data for detecting freely passable areas in the surroundings are processed together, and the freely passable area suitable for evasion is determined based on the first data and the second data.

23. The computer-readable data medium of claim 22, wherein the first data for detecting the obstacles are provided by at least one first sensor of the vehicle, and wherein the second data for detecting freely passable areas are provided by at least one second sensor of the vehicle.

24. The computer-readable data medium of claim 22, wherein a cell-grid-based analysis of the surroundings is performed.

* * * * *

UNITED STATES PATENT AND TRADEMARK OFFICE
CERTIFICATE OF CORRECTION

PATENT NO.        : 8,589,060 B2
APPLICATION NO. : 12/444365
DATED             : November 19, 2013
INVENTOR(S)       : Jan-Carsten Becker Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this
Twenty-second Day of September, 2015

Michelle K. Lee
*Director of the United States Patent and Trademark Office*